United States Patent [19]
Aberle et al.

[11] 3,761,811
[45] Sept. 25, 1973

[54] RATE-OF-TURN INDICATOR

[75] Inventors: Albert K. Aberle; Richard J. Arthur; Tommy R. Welch, all of Charlottesville, Va.

[73] Assignee: Sperry Rand Corporation, New York, N.Y.

[22] Filed: Mar. 5, 1971

[21] Appl. No.: 121,331

[52] U.S. Cl................. 324/173, 307/210, 318/328, 318/654
[51] Int. Cl. ............................................ G01p 3/48
[58] Field of Search................... 324/163, 165, 173, 324/176; 307/218, 210, 293; 328/127; 318/618, 328, 654

[56] References Cited
UNITED STATES PATENTS
| | | | |
|---|---|---|---|
| 3,253,218 | 5/1966 | Mayer................................. | 324/173 |
| 3,406,336 | 9/1968 | McCampbell...................... | 324/176 |
| 3,544,842 | 12/1970 | Yampolsky......................... | 324/165 |
| 3,603,869 | 9/1971 | Neuffer.............................. | 324/163 |
| 3,514,719 | 5/1970 | Rhodes.............................. | 318/654 |

*Primary Examiner*—Michael J. Lynch
*Attorney*—S. C. Yeaton

[57] ABSTRACT

Each of the three phase voltages from a synchro control transmitter is demodulated to provide separate d.c. voltages having amplitudes and polarities indicative of the corresponding transmitter output voltages. Each d.c. voltage is then differentiated and inverted to provide rate-of-change and inverted rate-of-change voltages. The various voltages are then applied to a logic circuit wherein the d.c. voltages are compared. The logic circuit determines the phase voltage having the smallest displacement at any given time and switches the corresponding rate of change signal to a readout device.

5 Claims, 3 Drawing Figures

RATE-OF-TURN INDICATOR

BACKGROUND OF THE INVENTION

1. Field of the Invention

The present invention relates to rate indicators and, more specifically to rate-of-turn indicators employing synchro control transmitters.

2. Description of the Prior Art

Rate-of-turn indicators are known in the art. Such indicators are frequently used, for instance, in navigation equipment wherein a tachometer generator may be geared directly to the azimuth drive motor in a gyro compass. Such systems, however, are severely limited in that they are relatively insensitive to low turn rates because the tachometer generator does not generate a useful output signal under these conditions. Furthermore, the sensitivity of such electromehcanical systems cannot be changed without dismantling the system.

Although not limited to navigation systems, the present invention makes use of the synchro control transmitters typical of those found in such nagivation systems. In general, the invention may be applied to synchro control transmitters operating in any environment. Previous attempts to obtain the rate-of-turn of the rotors in such synchro control transmitters have required elaborate circuitry to transform the output signals of the synchro control transmitter into useful rate information.

SUMMARY OF THE INVENTION

The present invention obtains rate-of-turn information from the three phase output of synchro control transmitter by differentiating each of the phase voltages, selecting the most nearly linear phase voltage at any given time and switching the corresponding differentiated voltage to an indicating means.

DESCRIPTION OF THE PREFERRED EMBODIMENT

A typical synchro control transmitter contains a rotor wound with a coil that is excited at a suitable carrier frequency. The stator winding provides three output voltages whose relative magnitudes and polarities uniquely define the angular position of the rotor with respect to the stator.

Figure 1:
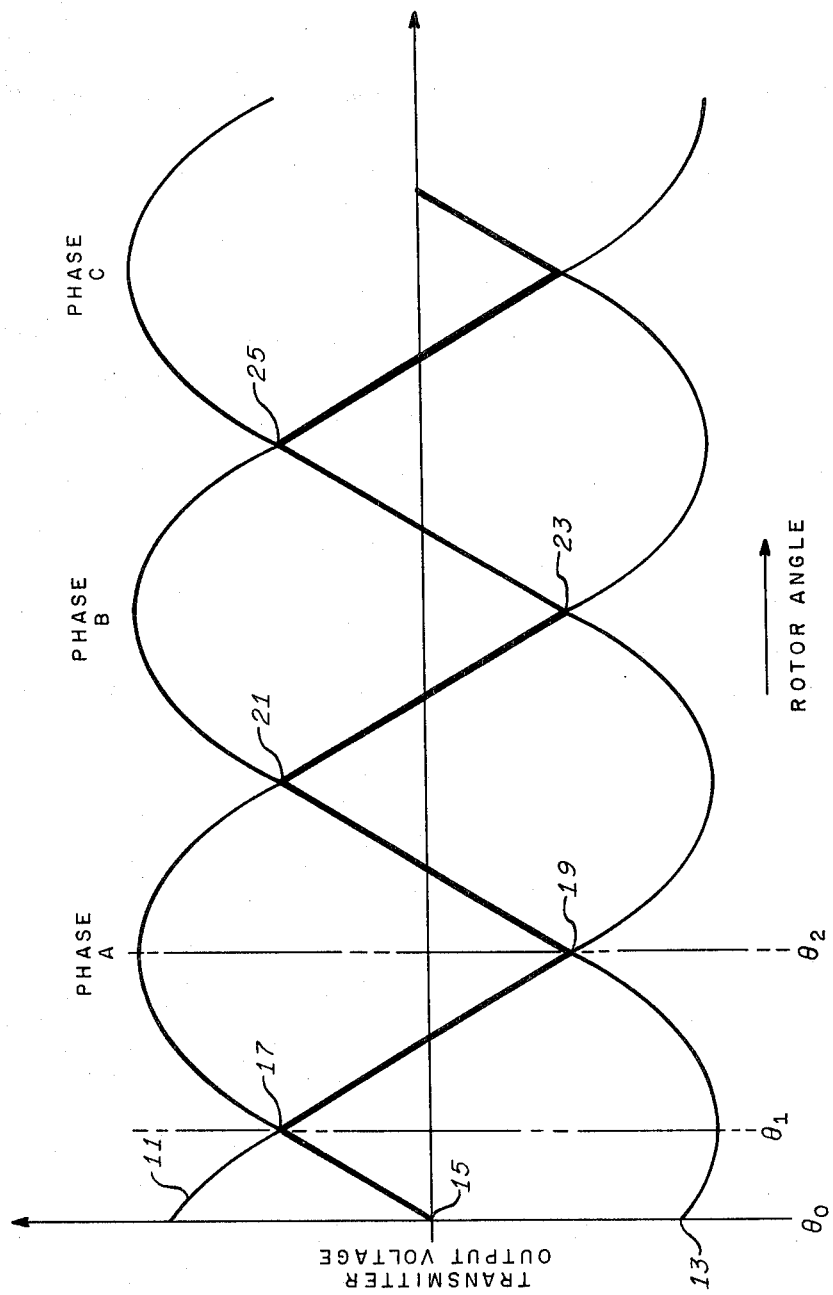
FIG. 1 is a graph useful in explaining the invention.

FIG. 1 illustrates the action of such a transmitter. The exciting voltage, typically having a frequency of 400 Hz, is modulated as the rotor is rotated so that the modulation envelope of the three transmitter output voltages resemble voltages occurring in a three phase system.

At a nominal rotor position of $\theta_0°$, the phase C voltage has a magnitude indicated by a point 11 in FIG. 1, whereas the phase B voltage has a magnitude indicated by point 13 and the phase A voltage has a zero magnitude as indicated by point 15. As the rotor is rotated through increasing angles, the phase B voltage increases to a maximum value at an angular displacement $\theta_1$. In the meantime, the phase A voltage rises while the phase C voltage decreases to a level 17. As the rotor displacement increases further, the magnitude of the phase A excitation voltage reaches a maximum at an angular displacement $\theta_2$. The magnitudes of the phase B and phase C voltages at angle $\theta_2$ become equal as indicated at the envelope intersection point 19. As the rotor displacement angle continues to increase, additional envelope intersection points 21, 23, 25, etc., occur.

The rate-of-turn of the rotor (displacement rate) might be determined by measuring the rate-of-change of any of the modulation envelopes depicted in FIG. 1. However, since these envelopes are highly non-linear, such measurements would be difficult. It will be noticed, however, that the central portions of the curves of FIG. 1 lying between the adjacent envelope intersection points have a substantially uniform slope. Therefore, the rate-of-change of a curve connecting two adjacent envelope intersection points is substantially constant. Furthermore, although adjacent central portions have opposite slopes, the absolute magnitudes of the slopes of all central portions are the same.

The present invention operates so as to utilize only the central portions of the various phase voltages.

Figure 2:
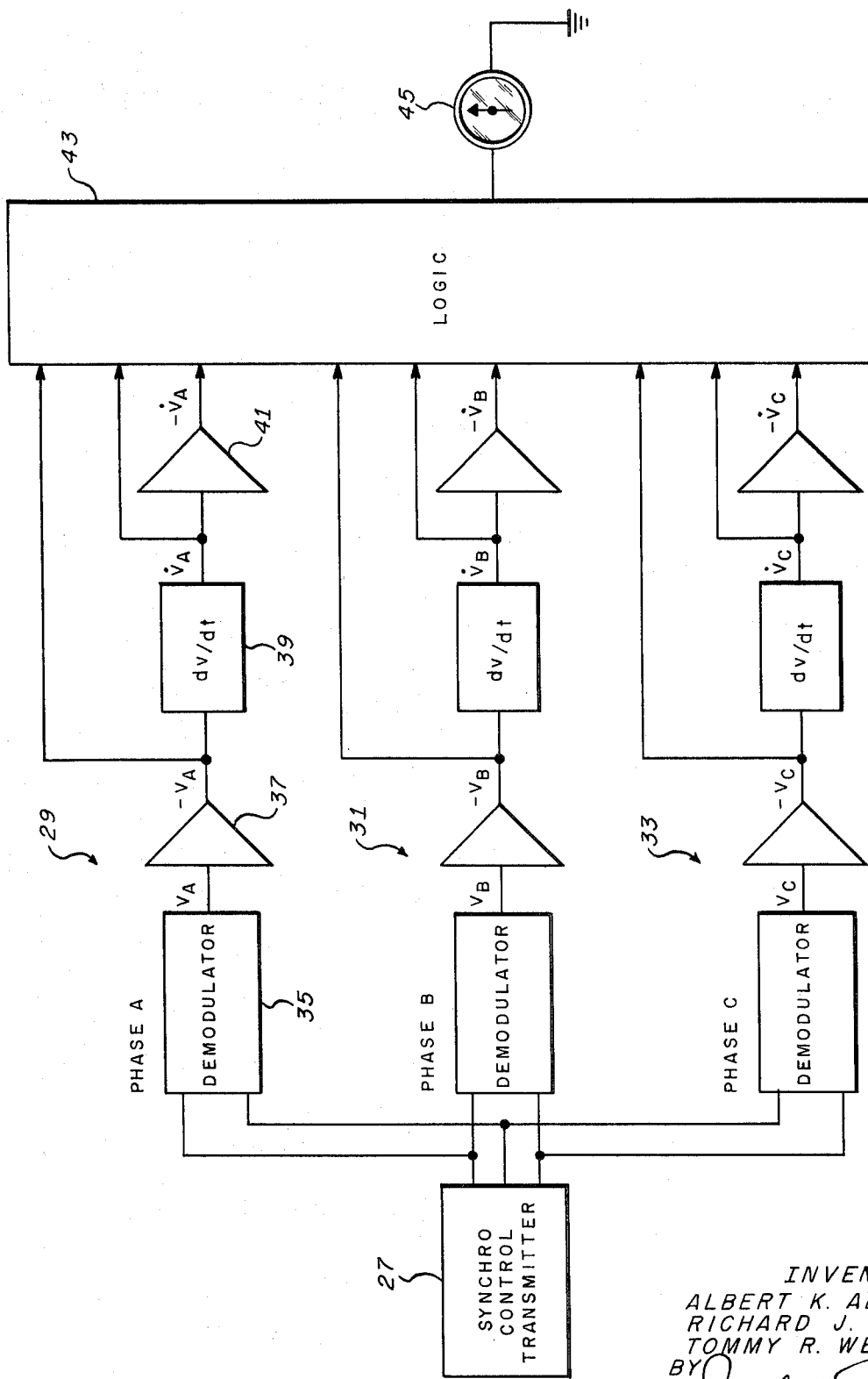
FIG. 2 is a block diagram illustrating the organization of components used in practicing the invention.

The mode of operation of the circuit of the invention may be understood by referring to FIG. 2. A synchro control transmitter 27 supplies voltages to three separate channels 29, 31 and 33. The voltage from phase A is applied to a demodulator 35 in the channel 29. The demodulator is a conventional phase sensitive rectifier which converts the modulated a.c. from the synchro control transmitter into a d.c. signal whose magnitude and phase varies with the modulation. Such phase sensitive rectifiers are discussed, for instance, in "Servomechanism Practice", W. R. Ahrendt, McGraw-Hill Book Company, N.Y., 1954. The output of the differentiating circuit 39 is again inverted in an amplifier 41. The inverted amplitude signal from the amplifier 37, the differential signal from the differentiator 39, and the inverted differential signal from the inverter 41 are applied to a logic circuit 43.

The channels 31 and 33 are identical to the channel 29. The output of the logic circuit is applied to an indicating device 45. The indicating device typically may be a zero-centered d.c. meter.

The components are biased so that the amplitude signals applied to he logic circuits are effectively referred to a level below the curves of FIG. 1. Thus, between the angles $\theta_1$ and $\theta_2$, the amplitude of the phase A voltage is greater than the amplitude of the phase C voltage, and the phase C voltage is greater than the phase B voltage.

Figure 3:
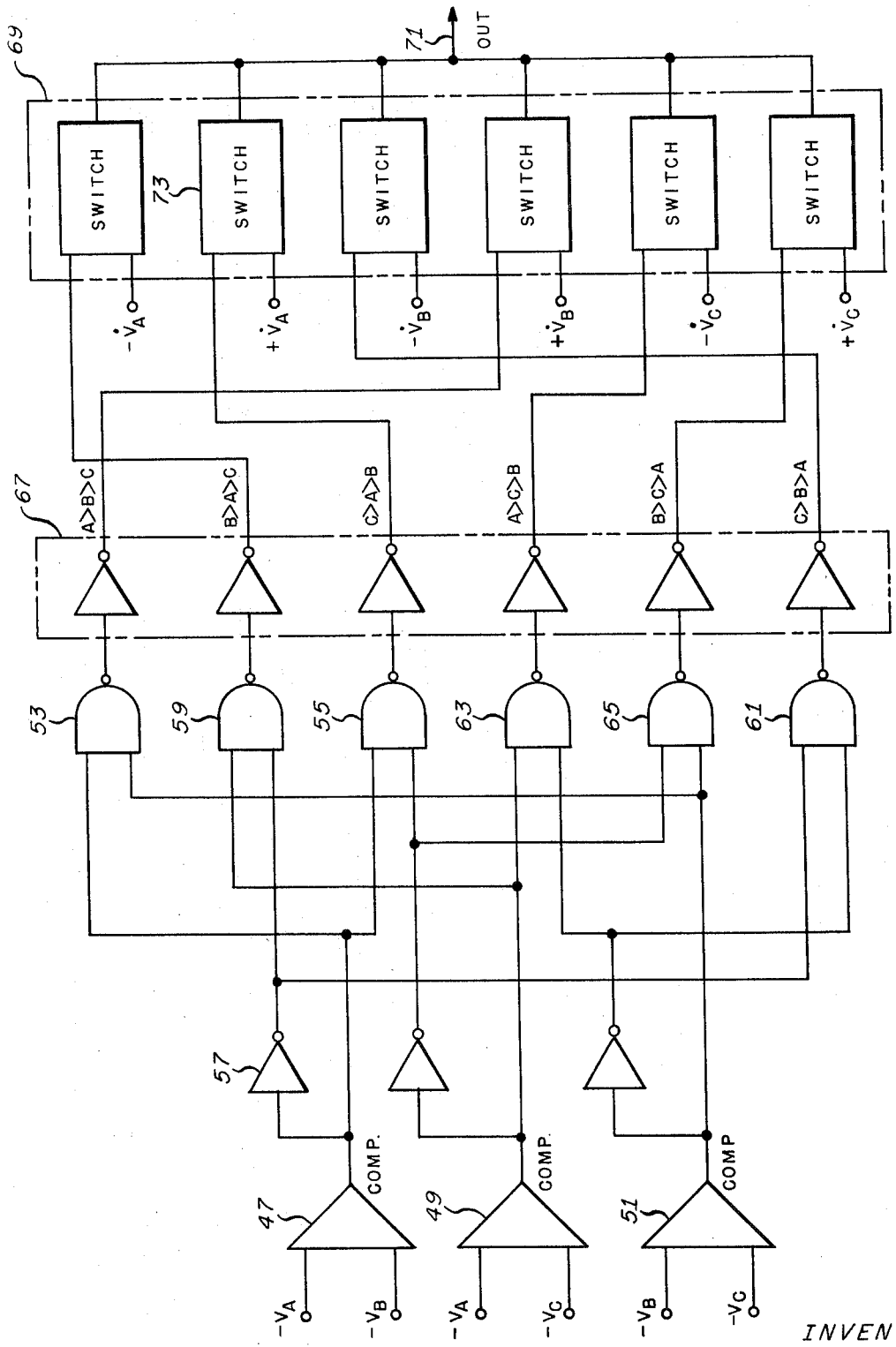
FIG. 3 is a schematic diagram illustrating a logic circuit that may be used in practicing the invention.

The logic circuit 43 is depicted i FIG. 3. The various inverted amplitude signals are applied to comparators 47, 49 and 51. The comparator 47 compares the amplitudes of the voltage in phases A and B and provides a high level output signal whenever the amplitude of the voltage from phase A exceeds the amplitude of the voltage from phase B. The comparator produces a low level output signal whenever the amplitude of the voltage from phase A is less than the voltage from the phase B.

Comparator 49 produces a high level signal when the voltage from phase A exceeds the voltage from phase C and a low level signal when the reverse condition occurs. Finally, the comparator 51 produces a high level output signal when the voltage from phase B exceeds the voltage from phase C and a low level signal when the reverse condition occurs. The voltage from the comparator 47 is applied to one of the input terminals on an AND gate 53 and one of the input terminals on an AND gate 55. The output of the comparator is also applied through an inverting circuit 57 to one of the input terminals on an AND gate 59 and one of the input terminals on an AND gate 61. Thus, when a high level signal is produced at the output of comparator 47, the gates 53 and 55 are enabled. When a low level signal si produced by the comparator 47, the AND gates 59 and 61 are enabled.

The comparator 49 is connected in a similar fashion so that an input signal is applied to the AND gates 59 and 63 when the comparator 49 produces a high level output signal and to the gates 55 and 65 when the comparator 49 produces a low level output signal.

Similarly, the comparator 51 provides an input signal to the gates 53 and 65 or to the gates 61 and 63 in response to a high level or a low level output signal, respectively. Each of the aforementioned AND gates produces a low level output signal when both of the input terminals of that gate receive an input signal and a high level output signal otherwise.

The output signal from each of the AND gates is inverted in an appropriate one of the inverting circuits in a bank 67. The output signals from the inverter circuits in the bank 67 are used to actuate corresponding switches in a bank 69. The switches receive voltages from the differentiating circuits and the differentiator inverter circuits representing the direct and inverted differentials of the synchro output voltages respectively. These switches are actuated in response to the signals from the inverters in the bank 67. The outputs of the switches in the bank 69 are applied to an output terminal 71.

The logic circuit operates in accordance with the following conditions as indicated in FIG. 3:

| Condition | Differential Used |
|---|---|
| $V_C > V_A > V_B$ | $\dot{V}_A$ |
| $V_B > V_A > V_C$ | $-\dot{V}_A$ |
| $V_A > V_B > V_C$ | $\dot{V}_B$ |
| $V_C > V_B > V_A$ | $-\dot{V}_B$ |
| $V_B > V_C > V_A$ | $\dot{V}_C$ |
| $V_A > V_C > V_B$ | $-\dot{V}_C$ |

$\oplus$

From the foregoing table and FIG. 1, it can be seen that a given differential signal is applied to the output terminal whenever the amplitude of the voltage applied to the logic circuit from the corresponding demodulator is intermediate the amplitude of the voltages from the remaining two demodulators.

Thus the positive differential of the phase A voltage is applied to the output terminal when the amplitude of the phase A voltage is greater than the phase B voltage but less than the phase C voltage. Similarly, the inverted differential of the phase A voltage is applied to the output terminal when the amplitude of the phase A voltage is greater than the amplitude of the phase C voltage but less than the amplitude of the phase B voltage.

It can also be seen from the foregoing table and FIG. 1 that as the transmitter rotor rotates so that the angle $\theta$ increases, the d.c. voltages reach their respective maximum values in the sequence A B C A B C A . . . Furthermore, when the instantaneous relative magnitudes of the d.c. voltages decrease in the same sequence, a positive differential signal is used. When the instantaneous relative magnitudes of the d.c. voltages decrease in the opposite sequence, an inverted differential signal is used. Moreover, it can be seen that a switch actuating signal appears at the output of a single inverter in the bank 67 as determined by the relative instantaneous magnitudes of the various d.c. voltages.

As an example, consider the case where the amplitude of the phase A voltage is less than the phase C voltage but greater than the phase B voltage. Under these conditions, the comparator 47 will produce a high level output signal so as to enable the gates 53 and 55. The comparator 49 will produce a low level output signal which will enable the gates 55 and 65. The comparator 51 will produce a low level output signal which will enable the gates 61 and 63. Thus only the gate 55 will receive two input signals. The resulting low level output signal from the gate 55 which will be inverted in the corresponding inverter in the bank 67 so as to close a switch 73 and connect the positive differential signal from phase A to the output terminal 71.

As rotation of the transmitter rotor continues, the various switches will be closed in the proper sequence so as to provide a continuing current to the output meter.

Thus, referring to FIG. 1, if the rotor is initially at $\theta_0$ and rotates through $\theta_1$, and $\theta_2$ in that order, the direct differential of the phase A voltage will be applied to the output meter while the rotor is between $\theta_0$ and $\theta_1$. The inverted differential of the phase C voltage will be applied to the output meter while the rotor is between $\theta_1$ and $\theta_2$. As the rotor continues to rotate, successive differentials and inverted differentials will be applied to the output meter as indicated in FIG. 1. Since the inverted differentials are used whenever the selected slope is negative, the current supplied to the output meter flows in the same direction so long as the direction of rotor rotation remains unchanged. If the direction of rotor rotation is reversed, the direction of current flow is reversed.

The circuit of the invention can detect very low rates of turn. This becomes important, for instance, where the circuit is used in a navigation system. The minimum rate of turn that can be detected is determined by the threshold of the gyrocompass rather than the rate circuit. Prior art electromechanical systems are not feasible at such low rates because the tachometer generator is unable to generate a useful output signal under these conditions.

Furthermore, the sensitivity of the circuit of the invention can be readily adjusted by means of a potentiometer or the like. Thus, in a navigation system the rate of turn circuit may be readily set to a high sensitivity for docking maneuvers or the like, and to a lower sensitivity for navigation as such.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A turn rate indicator for use with a synchro control transmitter of the type that produces three carrier waves having amplitudes indicative of the angular position of the rotor in said transmitter, said indicator comprising metering means, means to convert each of said carrier waves into a d.c. voltage having a magnitude representative of the magnitude of the corresponding carrier wave, logic means to select the d.c. voltage having a magnitude intermediate the remaining two d.c. voltages at any given time, means to provide differential signals indicative of the rate-of-change and the inverted rate-of-change of each of said d.c. voltages, and switching means responsive to the d.c. voltage selected by said logic means for actuating said metering means with a differential signal derived from said selected d.c. voltage.

2. A turn rate indicator for use with a synchro control transmitter of the type that produces three carrier waves having modulation envelopes that vary with rotation of the rotor of said transmitter in a manner resembling a three-phase voltage wave, said indicator comprising metering means, phase sensitive rectifying means for producing d.c. voltages having instantaneous magnitudes representative of the modulation envelopes of said carrier waves whereby said d.c. voltages reach their maximum values in a predetermined first sequence as the rotor rotates in a first direction, differentiating means to produce a time differential voltage corresponding to each of said d.c. voltages, inverter means to provide the inverted differential of each of said d.c. voltages, logic means, means in said logic means to determine the relative magnitude of said d.c. voltages, means in said logic means to select the d.c. voltage having a magnitude intermediate the magnitudes of the remaining two d.c. voltages, means in said logic means to couple the differential voltage corresponding to said intermediate voltage to said metering means when the instantaneous relative magnitudes of said remaining d.c. voltages decrease in the order of said first sequence, and means in said logic means to couple the inverted differential voltage corresponding to said intermediate voltage to said metering means when the instantaneous relative magnitudes of siad remaining d.c. voltages decrease in the order opposite to said first sequence.

3. A turn rate indicator for use with a synchro control transmitter of the type that produces three carrier waves having modulation envelopes that vary with rotation of the rotor of said transmitter in a manner resembling a three-phase voltage wave, said indicator comprising metering means, phase sensitive rectifying means for producing voltages $V_A$, $V_B$ and $V_C$ respectively, said voltages having instantaneous magnitudes representative of the modulation envelopes of said carrier wave, differentiating means to produce time differential voltages $\dot{V}_A$, $\dot{V}_B$ and $\dot{V}_C$ respectively, inverting means to provide the inverted differentials $-\dot{V}_A$, $-\dot{V}_B$ and $-\dot{V}_C$ respectively, logic means, means in said logic means to determine the relative magnitudes of said d.c. voltages, and means in said logic means to switch appropriate differential signals to said metering means in accordance with the following table:

| Condition | Differential Used |
| --- | --- |
| $V_C > V_A > V_B$ | $\dot{V}_A$ |
| $V_B > V_A > V_C$ | $-\dot{V}_A$ |
| $V_A > V_B > V_C$ | $\dot{V}_B$ |
| $V_C > V_B > V_A$ | $-\dot{V}_B$ |
| $V_B > V_C > V_A$ | $\dot{V}_C$ |
| $V_A > V_C > V_B$ | $-\dot{V}_C$ |

4. A turn rate indicator for use with a synchro control transmitter of the type that produces three carrier waves having modulation envelopes that vary with rotation of the rotor of said transmitter in a manner resembling a three-phase voltage wave, said indicator comprising metering means, phase sensitive rectifying means for producing voltages $V_A$, $V_B$ and $V_C$ respectively, said voltages having instantaneous magnitudes representative of the modulation envelopes of said carrier waves, differentiating means to produce time differential voltages $\dot{V}_A$, $\dot{V}_B$ and $\dot{V}_C$ respectively, inverting means to provide the inverted differentials $-\dot{V}_A$, $-\dot{V}_B$ and $-\dot{V}_C$ respectively, logic means, first, second and third comparators in said logic means connected to compare $V_A$ with $V_B$, $V_A$ with $V_C$ and $V_B$ with $V_C$ respectively, individual inverter means coupled to the output of each of said comparators so that direct and inverted signals may be obtained from said comparators, first gating means connected to provide switch actuating signals when direct signals are received from said first and third comparators, second gating means connected to provide a switch actuating signal when a direct signal is received from said second comparator and an inverted signal is received from said first comparator, third gating means connected to provide a switch actuating signal when a direct signal is received from said first comparator and an inverted signal is received from said second comparator, fourth gating means connected to provide a switch actuating signal when a direct signal is received from said second comparator and an inverted signal is received from said third comparator, fifth gating means connected to provide a switching actuating signal when a direct signal is received from said third comparator and an inverted signal is received from said second comparator, sixth gating means connected to provide a switch actuating signal when inverted signals are received from said first comparator and said third compartor, a bank of six switching means, each arranged to connect a different one of said differential and inverted differential voltages to said metering means in response to different ones of said switch actuating signals.

5. The apparatus of claim 4 wherein the first and second of said switching means are connected to couple differential and inverted differential voltages corresponding to $V_A$ to said metering means in response to signals from said third and second gating means respectively, wherein the third and fourth of said switching means are connected to couple differential and inverted differential voltages corresponding to $V_B$ to said metering means in response to signals from said first and sixth gating means respectively, and wherein the fifth and sixth switching means are connected to couple differential and inverted differential signals corresponding to $V_C$ to said metering means in response to signals from said fifth and fourth gating means respectively.

* * * * *